US005463002A

United States Patent [19]

Sugawara et al.

[11] Patent Number: 5,463,002
[45] Date of Patent: Oct. 31, 1995

[54] METATHESIS CATALYST SYSTEM

[75] Inventors: Tomoo Sugawara; Shingo Kudo, both of Kanagawa; Kin-ichi Okumura, Hyogo, all of Japan

[73] Assignee: Nippon Zeon Co., Ltd., Tokyo, Japan

[21] Appl. No.: 951,597

[22] Filed: Sep. 28, 1992

[30] Foreign Application Priority Data

Sep. 27, 1991 [JP] Japan .................. 3-276752

[51] Int. Cl.$^6$ ................ C08G 61/08; C08F 4/52
[52] U.S. Cl. .......... 526/161; 526/159; 526/169; 526/189; 526/283; 526/902; 502/103; 502/117; 502/152; 502/154; 502/171; 556/181; 556/182; 260/350 R
[58] Field of Search .................. 526/189, 161, 526/169, 283, 159, 902; 502/117, 152, 154, 171, 103; 556/181, 182; 260/350 R

[56] References Cited

U.S. PATENT DOCUMENTS

| | | | |
|---|---|---|---|
| 2,905,661 | 9/1959 | Muehlbauer et al. | 526/159 |
| 3,817,877 | 6/1974 | Malfroid | 526/189 X |
| 4,426,502 | 1/1984 | Minchak | 526/281 X |
| 4,481,344 | 11/1984 | Newburg | 526/283 |
| 4,774,214 | 9/1988 | Malpass et al. | 526/159 X |
| 4,835,230 | 5/1989 | Khasat et al. | 526/221 |
| 5,087,343 | 2/1992 | Woodson et al. | 204/242 |

FOREIGN PATENT DOCUMENTS

| | | | |
|---|---|---|---|
| 0799510 | 11/1968 | Canada | 556/181 |
| 0269948 | 6/1988 | European Pat. Off. . | |
| 0280247 | 8/1988 | European Pat. Off. . | |
| 0294620 | 12/1988 | European Pat. Off. . | |
| 0324980 | 7/1989 | European Pat. Off. . | |
| 0324979 | 7/1989 | European Pat. Off. . | |
| 46-34968 | 10/1971 | Japan | 526/159 |
| 1-81818 | 3/1989 | Japan . | |
| 1-126324 | 5/1989 | Japan . | |
| 1-135829 | 5/1989 | Japan . | |
| 1-221416 | 9/1989 | Japan . | |

Primary Examiner—Fred Teskin
Attorney, Agent, or Firm—Thoburn T. Dunlap

[57] ABSTRACT

A halogenated aluminum-based cocatalyst provides a metathesis catalyst system with high activity, moisture insensitivity, and long pot lives. The cocatalyst can be employed in solution or in in-mold bulk polymerization processes.

16 Claims, No Drawings

5,463,002

METATHESIS CATALYST SYSTEM

BACKGROUND OF THE INVENTION

1. Technical Field

This invention relates to the ring-opening metathesis polymerization of norbornene-functional monomers. In particular, this invention relates to a metathesis catalyst system comprising a catalyst and a cocatalyst component. More particularly, this invention relates to novel halogenated organoaluminum cocatalysts that are insensitive to moisture and possess high polymerization activity with long pot life.

2. State of the Art

Methods of polymerizing norbornene-functional monomers such as norbornene, dicyclopentadiene and tetracyclododecene by ring-opening polymerization are well known. Such polymerizations have been carried out in the presence of a metathesis catalyst system comprising a catalyst and cocatalyst component. Suitable catalysts have been selected from molybdenum, tungsten, and tantalum compounds. The cocatalyst includes an organometal compound such as an alkylaluminum, alkylaluminum halide, or alkyltin. Typically, these polymerization reactions are conducted in solution yielding thermoplastic resins, or in in-mold bulk operations yielding tough thermoset products.

In the in-mold bulk polymerization of norbornene functional monomers, the catalyst and cocatalyst components are dissolved in separate aliquots of monomer to form reactant solutions. Reactant streams from each of the catalyst and cocatalyst reactant solutions are mixed to form a monomeric reactive solution which is then conveyed into a closed mold. A chemical reaction occurs in the mold to transform the monomer into the polymeric state. Reaction injection molding (RIM) is a form of in-mold bulk polymerization. Typical RIM molded products include automobile parts such as bumpers, fenders, glove boxes, and the like; pipe couplers; and building panels used in the construction trade.

Recently, the RIM process has been gaining attention for use in the manufacture of large molded parts. U.S. Pat. No. 5,087,343 discloses a RIM process for molding cell heads for electrolytic chlor-alkali cells. While most RIM processes have resulted in good molding with norbornene functional monomers, difficulties have been experienced in molding large parts. A rapid reaction takes place upon mixing of the two reactant streams whereby a polymer barrier forms between the two reactant solutions. Some of the monomer from each reactant stream becomes encapsulated preventing adequate mixing. When molding large parts, extended pot life of the reactive monomer solution is desired. Pot life is defined as the time interval between mixing the reactant streams to form the reactive solution and the point where the solution becomes too viscous (i.e., gels) to adequately fill a mold. After this point the polymerization reaction progresses rapidly and the gel converts to a solid. The premature increase in viscosity of the reaction solution makes it difficult to uniformly convey the reaction solution throughout the mold. This results in molded products with flow marks or weld lines, leading to inferior physical properties.

Early attempts at in-mold bulk polymerization produced reactions that were too rapid and, therefore, uncontrollable. For this reason, methods were proposed to prolong the pot life of in-mold bulk polymerization reactive monomer formulations to prevent premature polymerization. Approaches to improve metathesis catalyst systems by utilizing an ether, ester, ketone, or nitrile in combination with the alkylaluminum cocatalyst have been proposed as disclosed in Japanese Kokai No. 58-129013.

In a further development it has been proposed to alkoxylate or phenoxylate the alkylaluminum cocatalyst in order to reduce the reducing power of the alkylaluminum cocatalyst therefore, extending the pot life of the reactive formulation. Such cocatalysts are disclosed in U.S. Pat. No. 4,426,502.

In in-mold bulk polymerization processes, it also is highly desirable to attain high monomer to polymer conversion. The slightest remnants of unconverted monomer that becomes entrained in the polymer adversely affects the heat resistance of the molded product. Moreover, the entrained monomer continuously volatilizes from the polymer giving off an offensive odor. Unconverted monomer also adversely affects the adhesion of paints and coatings to the surface of the molded product.

For reducing the residual unreacted monomer, the addition of various additives to the reactive formulation have been suggested. Metal and silicon halide additives have been disclosed in Japanese Kokai Nos. 63-186730, 1-301710, 1-126324, and 2-129221. Halohydrocarbon additives have been disclosed in Japanese Kokai Nos. 60-79035 and 1-221416. Halocarboxylic acids have been disclosed in Japanese Kokai No. 63-210122. Carboxylic acid anhydrides have been disclosed in Japanese Kokai No. 63-234021. Phosphorous chlorides have been disclosed in Japanese Kokai No. 1-81818. Sulphur halides have been disclosed in Japanese Kokai No. 1-135829. Among these, most of the metal and silicon halides and the halocarboxylic acids decompose in the presence of moisture, generating hydrochloric acid which corrodes the surface of metal molds. On the other hand, the halohydrocarbons do not present a corrosion problem, however, they are not as efficacious.

Moisture also has been found to adversely affect the activity of the organometallic cocatalyst. This is especially true when employing organoaluminum compounds. Small amounts of moisture contained in the monomer, atmosphere, mold cavity, additives, and the like reacts with the cocatalyst. Consequently, the activity of the cocatalyst diminishes. Moreover, depending on the moisture content of the polymerization system, the activity of the catalyst system will can vary from operation to operation.

Therefore, there is a need for a corrosion inhibiting cocatalyst that imparts a long pot life, provides high monomer conversions, and is moisture insensitive.

SUMMARY OF THE INVENTION

It is a primary object of the present invention to provide a metathesis catalyst system that provides reactive formulations with long pot lives.

It is another object of the present invention to provide a moisture insensitive cocatalyst that increases the conversion of monomer to polymer.

It is a further object of this invention to provide stable monomer formulations.

It is still a further object of this invention to provide a metathesis catalyst system that is highly active without the need for conversion enhancing additives.

A further object is to provide in-mold bulk polymerizable feed compositions that reduce metal mold corrosion.

A still further object is to provide a long pot life feed composition that is in-mold bulk polymerizable into polymeric articles that possess a high thermal deformation temperature.

These and other objects of the present invention are achieved by employing a metathesis catalyst system comprising a metathesis catalyst and a metathesis cocatalyst selected from halogenated aluminum compounds of the following formula:

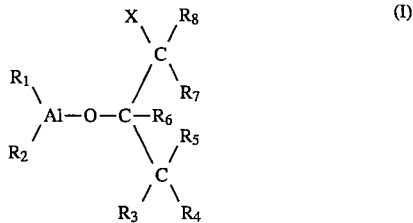

(I)

wherein $R_1$ is alkyl or aryl; $R_2$ is alkyl, aryl, alkoxy, aryloxy, or halogen; $R_3$ is hydrogen or halogen; $R_4$ to $R_8$ are independently selected from hydrogen, branched or unbranched $C_1$ to $C_{12}$ alkyl, or halogen, and any of $R_4$ to $R_8$ can be taken together to form a saturated or unsaturated carbocyclic ring; and X is a halogen.

The halogenated cocatalysts of this invention are utilized with a metathesis catalyst in the metathesis polymerization of cycloolefins that contain at least one norbornene functionality. The polymerization reaction can be conducted in solution or in bulk, with in-mold bulk polymerization being the preferred method. In in-mold bulk polymerization a reaction solution containing a catalyst, cocatalyst, and monomer is conveyed into a mold cavity and polymerized. A tough solid article having the shape of the mold cavity is produced.

The metathesis catalyst system, polymerization method, and reaction solution used in this invention are discussed in further detail below.

DETAILED DESCRIPTION

Cycloolefin Monomer

The monomers that can be employed for the solution and in-mold bulk polymerization processes carried out in the presence of a catalyst system containing the metathesis cocatalyst of this invention are cycloolefins containing norbornene-functional group(s). Such norbornene-functional cycloolefin monomers are polycyclic norbornenes having 2 rings or more rings. Examples of bicyclic monomers include norbornene, norbornadiene, methylnorbornene, dimethylnorbornene, ethylnorbornene, alkylidene norbornenes, chlorinated norbornenes, chloromethylnorbornene, trimethylsilylnorbornene, phenylnorborne, cyanonorbornene, dicyanonorbornene, methoxycarbonylnorbornene, pyridylnorbornene, nadic acid anhydride, nadic acid imide, and the like. Examples of tricyclic monomers include dicyclopentadiene, dihydrocyclopentadinene, and their alkyl, alkenyl, alkylidene, and aryl derivatives. Examples of tetracyclic monomers include dimethanohexahydronaphthalene, dimethanooctahydronaphthalene, and their alkyl, alkenyl, alkylidene, and aryl derivatives. Examples of pentacyclic monomers include tricyclopentadiene. Examples of hexacyclic monomers include hexacycloheptadecene. Substituted and unsubstituted dinorbornenes formed by coupling of two norbornene moieties with a hydrocarbon or ester bridge also are contemplated. Substituents include alkyl and aryl groups.

Thermoplastic and thermosetting polymers can be produced according to the method of this invention. Thermoplastics are formed when monomers containing a single double bond (e.g., norbornene) are employed. Crosslinked thermosets can be obtained by employing monomers containing two or more double bonds (e.g., dicyclopentadiene or tricyclopentadiene). Methods of obtaining polymers with a high crosslink density are disclosed in U.S. Pat. No. 4,701,510 which is hereby incorporated by reference. Polymers exhibiting a wide variety of physical properties can be obtained by mixing various ratios of monomers containing a single double bond and monomers containing two or more double bonds.

The above-mentioned norbornene-functional monomers can be used alone or in combination. The use of two or more different monomers is preferred. In addition, mixing monomer components depresses the freezing point of the monomer mix in contrast with using a single monomer component. In this way the monomer mixture is usable under a wider range of handling conditions.

Optionally, the norbornene-functional monomers can be copolymerized with substituted or unsubstituted monocyclic monomers such as cyclobutene, cyclopentene, cyclooctene, or cyclododecene.

Metathesis Catalyst

Any known metathesis ring-opening catalyst suitable for polymerizing norbornene-functional monomers can be employed in this invention. Representative examples are disclosed in Japanese Kokai Nos. 58-127728 and 58-129013. There are no limitations to the type of metathesis catalyst that can be employed so long as it can be utilized with the cocatalyst of the present invention.

Examples of metathesis catalysts are the halides, oxyhalides, oxides, or organoammonium salts of tungsten, molybdenum, and tantalum; oxyacid salts such as sodium molybdate or ammonium hexamolybdate; or heteropoly acids. Among these, the halides, oxyhalides, and organoammonium salts of tungsten and molybdenum are preferred. For purposes of corrosion prevention, organoammonium salts are especially preferred. Examples of suitable organoammonium salts are tridodecyl ammonium molybdate or tungstate, methyltricapryl ammonium molybdate or tungstate, tri(tridecyl) ammonium molybdate or tungstate, and trioctyl ammonium molybdate or tungstate.

Metathesis Cocatalyst

The cocatalysts of the present invention are selected from halogenated aluminum compounds represented by the following formula:

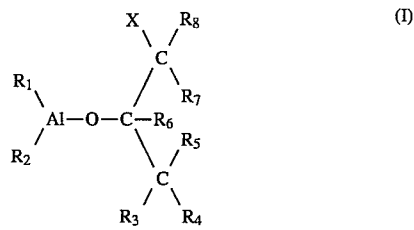

(I)

wherein $R_1$ is selected from branched or unbranched $C_1$ to $C_{12}$ alkyl, or $C_6$ to $C_{12}$ aryl; $R_2$ is selected from branched or unbranched $C_1$ to $C_{12}$ alkyl, $C_6$ to $C_{12}$ aryl, branched or unbranched $C_1$ to $C_{12}$ alkoxy, $C_6$ to $C_{12}$ aryloxy, or halogen; $R_3$ is selected from hydrogen, or halogen; $R_4$ to $R_8$ are independently selected from hydrogen, branched or unbranched $C_1$ to $C_{12}$ alkyl, or halogen, and any of $R_4$ to $R_8$ can be taken together to form a saturated or unsaturated carbocyclic ring; and X is a halogen selected from chlorine, fluorine, or iodine. In formula I above $R_2$ and $R_3$ are preferably halogen, and X is preferably chlorine.

Preferably the metathesis cocatalysts of formula I have a halogen atom attached to the gamma-carbon relative to the aluminum atom (i.e., the carbon atom having the X substituent attached thereto). The cocatalysts of the present invention extend pot life of reactive norbornene-functional formulations just as well as the conventional alkoxyalkylaluminum and aryloxyalkyl aluminum cocatalysts. However, the cocatalysts of the present invention increase the reaction rate relative to the prior art cocatalysts. Moreover, the present cocatalysts do not require metal or silicon halide compound additives in order to increase monomer to polymer conversions. Additionally, the cocatalysts of this invention are less corrosive to metal surfaces under normal reaction and molding conditions.

Surprisingly, the present cocatalysts are effective in the presence of small amounts of water. The reason for this is not certain but, apparently, the reaction of the cocatalyst with water is inhibited due to the secondary or tertiary carbon-oxygen group located in the vicinity of the elemental aluminum. At the same time it is believed that the halogen positioned on the gamma-carbon relative to the elemental aluminum promotes the catalyst performance at the metathesis polymerization activation site.

The cocatalysts represented by formula (I) can be synthesized from the reaction of an organoaluminum compound with a haloalcohol, haloketone, or halophenol. The synthesis can be carried out by mixing the starting compounds in a norbornene-functional cycloolefin monomer or in an inert hydrocarbon solvent. When a haloalcohol is reacted with an organoaluminum compound a substitution reaction occurs between the hydrocarbon group on organoaluminum compound and the hydroxyl group supplied by the haloalcohol. A gas may evolve from the dissociation of hydrocarbon group from the aluminum. Similarly, in the case of a haloketone, a gas may evolve from the formation of an alkene from the organoaluminum compound.

Representative of the alcohols that can be used in the synthesis of the present cocatalysts are 1-chloro-2-ethanol, 1,1-dichloro-2-ethanol, 1,1,1-trichloro-2-ethanol, 1-chloro-2-propanol, 1,3-dichloro-2-propanol, 1,1-dichloro-2-propanol, 1,1,1-trichloro-2-propanol, hexachloroisopropanol, 2-chloro-2-propane-1-ol, 1-chloro-2-butanol, 1-chloro-3-methoxy-2-propanol, 1,3-dibromo-2-propanol, 1,3-diiodo-2-propanol, 2-chlorocyclohexanol, etc. Representative of the haloketones are 1-chloroacetone, 1,3-dichloroacetone, hexachloroacetone, chloromethyl ethyl ketone, 1,1,1-trichloroacetone, 1,1-dichloro-2-propanone, 2-chlorocyclopentanone, 2-chlorocyclohexanone, 1,1-dichloroacetophenone, 2,2',4'-trichloroacetophenone, 2-chloropropionyl chloride, and the like. Representative halophenols are 2,6-dibromophenol, 2,4,6-trichlorophenol, dibromobisphenol A, hexachlorophenone, and the like.

Representative organoaluminum compounds that can be utilized in synthesizing the present cocatalysts are trimethylaluminum, triethylaluminum, triisobutylaluminum, trioctylaluminum, dimethylaluminum chloride, diethylaluminum chloride, dioctylaluminum iodide, ethylaluminum sesquichloride, n-propoxydiethylaluminum, n-propoxyethylaluminum chloride, and the like.

Conventionally, it is known that, during a reactive injection molding process, an organoaluminum compound is mixed into a portion of monomer to form one reactant solution, and the other reactant solution is formed by mixing a metathesis catalyst in another portion of monomer in combination with a halogen compound such as hexachloroacetone, as disclosed in Japanese Kokai No. 60-79035. However, in this method, the stability of a cocatalyst toward moisture cannot be expected. Also, the cocatalyst shown in formula (I) must be prepared prior to the polymerization reaction, (i.e., the cocatalyst precursor components must be prereacted; this reaction cannot be conducted in situ). If the cocatalyst precursor components are used in situ, the polymerization activity drops off and the reproducibility of polymerization reaction may be difficult.

The present cocatalysts can be utilized in combination with conventional metathesis cocatalysts. By using several cocatalysts in combination, the reaction rate can be accelerated or the affect of moisture on the catalytic activity can be controlled. For the other cocatalysts, a compound having metathesis catalyst reducing capacity is used. Examples of such cocatalysts include alkylaluminums, alkylaluminum halides, and cocatalysts other than those of the invention, such as alkyoxyalkylaluminum halides or aryloxyalkylaluminum halides, organotin compounds, organozinc compounds, organomagnesium compounds, organosilane compounds, and the like.

Activating Agent

In order to accelerate the polymerization rate and to increase the reaction rate of the monomer, an activating agent can optionally be employed. Examples of suitable activating agents include haloketones, haloesters, metal alkoxide, metal halides, halohydrocarbons, and the like.

Activity Controlling Agent

When polymerization does not propagate beyond a localized point due to the high reaction rate, then the amount of catalyst might need to be reduced or the ratio of metathesis catalyst to cocatalyst might need to be changed. Alternatively, an activatiy controlling agent also can be employed. Suitable activity controlling agents include alcohols, ethers, acids, esters, nitriles, amines, and the like.

The amount of a metathesis catalyst per mole of norbornene-functional monomer employed is about 0.01 to about 50 mmoles, preferably about 0.05 to about 5 mmoles. The ratio of cocatalyst to catalyst employed is about 0.1 to about 200 (mole ratio), preferably about 1 to about 10 (mole ratio).

It is preferred that the metathesis catalyst, cocatalyst, activating agent, and activity controlling agent be mixed in monomer. Alternatively, they may be added as a suspension or solution in a small amount of solvent providing that the solvent does not affect the properties of the product.

Additives

The properties of a molded product can be modified by the addition of antioxidant, UV absorbing agent, elastomer, polymer modifying agent, filler, coloring agent, flame retardant, cross-linking agent, lubricant, odor adsorbing or masking agent, fillers, foaming agents, whiskers for surface smoothing, and the like.

Suitable antioxidants include any antioxidant used for plastic and rubber manufacturing. The antioxidants can be phenol, phosphorus, or amine based compounds. The antioxidants can be used singly, or preferably in combination. The formulation ratio is more than 0.5 part preferably 1 to 3 parts of antioxidant per 100 parts by weight of norbornene-functional monomer. The antioxidant may be copolymerizable with the monomer such as 5-(3,5-di-tertiary-butyl-4- hydroxybenzyl-2-norbornene, which is a norbornenylphenol based compound (See Japanese Kokai No. 57-83522).

Suitable fillers include glass powder, carbon black, talc, calcium carbonate, mica, aluminum hydroxide, and the like. Preferably, such fillers may be surface treated with a silane coupling agent.

Fiber reinforcing agents such as glass, carbon, and the like can also be used.

Sulfur and peroxide crosslinking agents can be employed to improve heat resistance.

The additives can be dissolved or dispersed in at least one of the monomer reactant solutions prior to the reaction injection molding process.

Polymerization Method

In the polymerization of a norbornene-functional monomer in the presence of a metathesis catalyst system containing a metathesis cocatalyst according to this invention, an in-mold bulk polymerization process or solution polymerization process can be employed.

An in-mold bulk polymerization process, especially reaction injection molding (RIM), of the norbornene-functional monomers, is the preferred polymerization process. In the RIM method, a small amount of inert solvent may be present in the system so long as the properties of the molded product are not adversely affected. Preferably, in the in-mold bulk ring-opening polymerization process, the monomer mixture is divided into two portions and stored in separate containers. The metathesis catalyst is added to one container, and the metathesis cocatalyst is added to the other container to form two reactant solutions. The two reactant solutions are mixed to form a reactive solution which is then conveyed into a heated mold for polymerization.

In the RIM process a conventional RIM machine is used for mixing two reactant solutions. In this case, the two reactant solutions are fed from two individual containers. The two streams are instantly mixed in the impingement mixing head of the RIM machine and then injected into a heated mold where instantaneous polymerization occurs yielding a molded product.

Alternatively, after the mixing of the two reactant solutions, the reactive solution can be injected into the preheated mold in several portions as disclosed in Japanese Kokai No. 59-51911 (U.S. Pat. No. 4,426,502 which is hereby incorporated by reference in its entirety).

Optionally, after mixing the two reactant solutions, the mixture can be conveyed (poured or injected) into a mold in several portions (batch feeding) as taught in Japanese Kokai No. 59-51911. Alternatively, the reaction solution can be injected in a continuous mode. With this method, the apparatus is smaller in comparison to an impingement type mixing apparatus allowing the process to be carried out at lower operating pressures. When a large amount of glass fiber reinforcement is utilized within the mold, the injection of reaction solution may be carried out at a low injection speed to allow the solution to homogeneously infiltrate the glass fibers.

This invention is not limited to a two reactant stream process. A third reactant stream (or a plurality of streams) containing an additional reactant(s) or additive(s) can be employed in the present process.

The mold temperature employed is commonly greater than room temperature, preferably between about 40° to about 200° C., and more preferably between about to 50° to about 120° C. The clamping pressure is commonly between about 0.1 to about 100 kg/cm².

The polymerization time can be determined as needed. However, the time from feeding the reactive solution into the mold cavity to the onset of the smoking time preferably should be within five minutes, and preferably within two minutes.

The reactant solutions are stored under an inert gas atmosphere such as nitrogen, and also should be processed under such an inert atmosphere. However, the mold does not necessarily have to contain an inert gas.

In the solution polymerization process, it is preferred that a hydrocarbon solvent mixed be with norbornene-functional monomer or monomer mixture and then fed into a reaction vessel. If needed, a molecular weight controlling agent can be added into the reaction vessel and then the metathesis catalyst, metathesis cocatalyst and any additional hydrocarbon reaction solvent are added into the reaction vessel under stirring. Generally, the reaction can be terminated by a terminating agent such as an alcohol. The reaction can be completed within 2–3 hours at room temperature.

The solvent can be selected from an aliphatic or cycloaliphatic compound containing 4–10 carbons such as pentane, hexane, heptane, octane, cyclohexane, cyclooctane, and the like; a liquid or readily liquefying aromatic hydrocarbon containing 6–14 carbons such as benzene, toluene, or naphthalene; or a hydrocarbon having inert substituents such as dichloromethane, chloroform, chlorobenzene, dichlorobenzene, and the like. Among these, cyclohexane is preferred. It is better if the polymer does not dissolve in the solvent. The amount of solvent utilized is 0.5–2 liter per 100 grams of monomer.

The invention will be discussed in more detail in the following examples which are not intended to serve as a limitation of the scope thereof. As used herein parts and percents are based on weight unless otherwise specified.

The reactivity of the catalyst system and the polymer were characterized by the following measurements.

Pot life (PL): the time interval from the mixing of the catalyst and cocatalyst reactant solutions to the point at which the reactive solution reaches a pudding-like consistency is defined as pot life (PL).

Smoking time (SMT): the time interval from mixing the reactant solutions to the point at which an exotherm is reached. At this point the vaporization of unconverted monomer occurs as the monomer boiling point is reached. This phenomenon gives the appearance of smoke. This point can be used as a guide for the determination of the termination of the polymerization reaction. The measurement of PL and SMT were carried out under a nitrogen atmosphere.

After polymerization, the polymer is cooled to room temperature, and the glass transition temperature (Tg) was determined by a differential scanning calorimeter.

Reaction rate: Similar to Tg measurement, the polymer is heated from room temperature to 400° C. on a thermal balance to determine the residual weight fraction to determine the reaction rate.

The evaluation of the effect of moisture was determined by adding 100 ppm water to the norbornene-functional monomer, and then the same characterization procedures were applied to determine the reactivity.

Corrosivity: a steel (SS-41) coupon was immersed in the monomer containing the dissolved cocatalyst, activating agent (Comparison example) under atmosphere at about 70 percent humidity for two days and the corrosion on the steel surface was observed to determine the corrosiveness.

EXAMPLES

Example 1 and Comparison Example 1

Synthesis of metathesis cocatalyst

The metathesis cocatalysts of the invention were synthesized by reacting the haloalcohols and haloketones set forth in Table 1 with diethylaluminum chloride (DEAC). A 1.0M/l solution of DEAC in monomer consisting of 95 parts of dicyclopentadiene (DCP) and 5 parts of norbornene (NB) was reacted with a 1.0M/l solution of halogenated alcohol or ketone in monomer set forth in Table 1. The 1.0M/l haloalcohol and haloketone solutions were made up in a similar monomer mixture (95/5 DCP/NB) as the DEAC.

In Test No. 2 in Table 1, the 1-chloro-2-propanol and DEAC reaction took place stoichiometrically and the theoretical amount of ethane evolution was confirmed. Also, the product structure was determined by nuclear magnetic resonance analysis ($C^{13}$-NMR) as

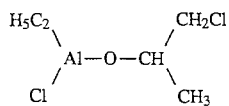

In Test No. 6 using 1-chloroacetone in the reaction, the evolution of ethylene gas was confirmed and $C^{13}$-NMR analysis showed that the product had same absorption as Test No. 2; hence, the formation of the same product was confirmed.

Bulk polymerization using molybdenum based metathesis catalysts

A glass ampule at 30° C. was flushed with nitrogen. Into the ampule was placed 100 parts 95/5 DCP/NB monomer mixture and 2 parts 2,6-di-tert-butyl-p-cresol.

A 0.5M/l concentration of the cocatalyst in the 95/5 DCP/NB monomer was prepared and added to the ampule to give a 10 mM/l concentration.

A 0.5M/L concentration of tri(tridecyl) ammonium molybdate catalyst dissolved in a 95/5 DCP/NB monomer mixture was then added under stirring to give a 5 mM/l catalyst concentration. Upon the addition of the catalyst solution the polymerization reaction commenced. After the termination of the reaction, the glass ampule was broken and the molded polymer product was recoveved. The product was evaluated for glass transition point (Tg) and conversion rate. The data are listed in Table 1 together with the reaction parameters.

|  |  | Invention examples | | | | | | | | Comparison |
|---|---|---|---|---|---|---|---|---|---|---|
| Test No. |  | 1 | 2 | 3 | 4 | 5 | 6 | 7 | 8 | 9 |
| Halogen compounds |  | 1,3-Di-chloro-2-propanol | 1-Chloro-2-propanol | 1-Chloro-2-ethanol | 1,3-Di-chloro-2-propanol | Hexa-chloro-acetone | 1-Chloro-acetone | 2,6-Di-bromo-phenol | 2,4,6-Tri-chloro-phenol | n-Propanol and equal mole of silicon tetrachloride |
| Reactivity | PL (seconds) | 18 | 35 | 30 | 15 | 8 | 38 | 65 | 48 | 30 |
|  | SMT (seconds) | 74 | 156 | 147 | 69 | 35 | 190 | 250 | 198 | 185 |
| Resin character-istics | Tg (°C.) | 145 | 143 | 146 | 146 | 149 | 146 | 141 | 144 | 144 |
|  | Reaction rate (%) | 99.5 | 99.3 | 99.5 | 99.3 | 99.7 | 99.6 | 99.0 | 99.3 | 99.3 |
| Reactivity in the presence of 100 ppm of water in monomer | PL (seconds) | 19 | 40 | 46 | 30 | 10 | 45 | 71 | 55 | 314 |
|  | SMT (seconds) | 79 | 182 | 174 | 93 | 39 | 192 | 252 | 206 | None (insufficient polymerization) |
| Corrosiveness |  | none | none | none | none | none | none | none | none | Very severe |

From the data in Table 1, the metathesis catalyst system containing the metathesis cocatalyst of the invention has a reaction rate similar to those of conventional metathesis catalysts. However, the system is insensitive to moisture. The cocatalyst did not corrode the metal coupon. An alkoxy compound with halogen at $R_3$ in formula (I) showed especially high reactivity (Test Nos. 1, 4, and 5). Also, an aryloxy compound with halogen at $R_3$ showed significantly low corrosiveness (Test No. 7 and 8).

Example 2

Metathesis Cocatalyst preparation and bulk polymerization using Molybdenum based metathesis catalyst In this example DEAC was replaced with dimethylaluminum chloride and the metathesis cocatalyst was synthesized according to Example 1 Test No. 1. The resulting cocatalyst structure was confirmed as follows:

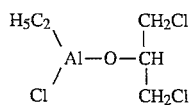

An in-mold bulk polymerization was carried out as specified in Example 1 Test No. 1. The PL was 15 seconds and SMT was 40 seconds. The reactivity in the presence of 100 ppm water was PL 15 seconds and SMT of 39 seconds, showing that water has practically no effect. The Tg of the polymer was 148° C. and the conversion rate was 99.3 percent. No corrosion of the metal coupon was observed.

Example 3 and Comparison Example 2

Metathesis cocatalyst synthesis and bulk polymerization using molybdate based metathesis catalyst Cocatalyst reactant solution A was prepared as follows:

2 parts 2,6-di-tert-butyl-p-cresol were dissolved in a mixture consisting of 95 parts DCP and 5 parts NB and then (1,3-di-chloro-2-propoxy)ethylaluminum chloride, (synthesized from 1,3-di-chloro-2-propanol and DEAC) was added to give a 40 mM/l concentration in monomer.

Catalyst reactant solution B was prepared as follows:

tri(tridecyl) ammonium molybdate catalyst was added to 100 parts of a 95/5 DCP/NB monomer mixture to give a 10 mM/l concentration in monomer.

A 1:1 ratio of A and B reactant solutions were mixed in a power mixer and rapidly fed (by gear pump) into a steel mold heated to 40° C. The mold cavity measured 200× 200×3 mm. The mold took 10 seconds to fill. The mold was opened two minutes later and a solid plaque was removed. The entire operation was carried out under normal atmosphere.

The molded product surface and mold cavity surface had virtually no sticky spots (presumably caused by unreacted monomer) and the plaque surface appearance was excellent.

For comparison, instead of utilizing the metathesis cocatalyst of the invention, 40 mM/l of DEAC, 40 mM/l of n-propanol, and 14 mM/l of silicon tetrachloride were employed. The same operation was repeated and the resulting molded product was examined. Sticky spots were observed on the mold edges and the surface of the molded product had a tacky feeling.

Example 4

Bulk polymerization using a tungsten based metathesis catalyst

The tri(tridecyl) ammonium molybdate in Example 1, Test No. 1 was replaced with a tungsten based catalyst which is described below. The bulk polymerization was carried out according to the procedure of Example 1. The PL was 33 seconds, and SMT was 87 seconds. The reactivity in the presence of 100 ppm water was PL 38 seconds and SMT 95 seconds. The effect of water was negligible. The Tg of polymer was 139° C. and the conversion rate was 98.9 percent.

The tungsten-based catalyst of the example was prepared in the following manner. 20 parts of tungsten hexachloride were added to 88 parts by volume of dry toluene under a nitrogen atmosphere. 2 parts of nonylphenol were then added and the resulting system was flushed with nitrogen overnight to remove evolving hydrogen chloride gas produced from the reaction of tungsten hexachloride and nonylphenol. Subsequently, 10 parts of acetylacetone were added to obtain 0.5 mole/l of the tungsten catalyst.

For comparison, the tri(tridecyl) ammonium molybdate in the 95/5 DCP/NB monomer mixture solution of Example 1 Test No. 9 (Comparison) was replaced with the tungsten-based catalyst and bulk polymerization was carried out according to the procedure of the example (Comparison). The PL was 35 seconds and SMT was 110 seconds. The reactivity in the presence of 100 ppm water was PL 180 seconds and SMT none.

Example 5

Solution polymerization using molybdate base catalyst

A glass ampule at 30° C. was flushed with nitrogen. To the ampule 60 parts of NB, 1 part of 2,6-di-tert-butyl-p-cresol, and 39 parts of toluene were added and dissolved.

A metathesis cocatalyst according to the invention was prepared by reacting a 1:1 mixture of 1,3-dichloro-2-propanol and DEAC. The cocatalyst and a tri(tridecyl) ammonium molybdate catalyst were added to toluene to give 0.4M/l and 0.1M/l concentrations respectively. The stock catalyst system solution was added under mixing to the ampule containing the norbornene-toluene solution to give 1 mM/l molybdenum concentration. A reaction commenced immediately and the viscosity of the reaction solution increased rapidly. The mixture reached a pudding-like consistency after five minutes. The resulting product was vacuum dried at 100° C. and a rubber-like polymer was obtained. The polymer yield was 95 percent on the basis of initial amount of norbornene employed.

Comparison Example

In Example 5, instead of the molybdate metathesis catalyst system, a catalyst solution consisting of 2 g ruthenium chloride and 1.01 n-butanol was prepared. The ruthenium solution was then added to the norbornene-toluene solution to give a 1 mM/l ruthenium concentration. The reaction was carried out according to the procedure of the example. The viscosity of the mixture initially increased after the addition of the catalyst solution but did not increase any further after 10 minutes. Upon heating to 60° C., the viscosity gradually increased. After about 10 minutes a pudding-like polymer was obtained. The resulting polymer was vacuum dried at 100° C. and a rubber-like polymer resulted. The yield of polymer on the basis of the initial amount of norbornene used for the reaction was 80 percent.

What is claimed is:

1. A metathesis polymerizable composition comprising a metathesis catalyst, a norbornene-functional monomer, and a cocatalyst selected from halogenated aluminum compounds of the formula:

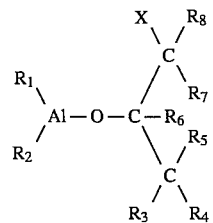

wherein $R_1$ is selected from branched or unbranched $C_1$ to $C_{12}$ alkyl, or $C_6$ to $C_{12}$ aryl; $R_2$ is selected from branched or unbranched $C_1$ to $C_{12}$ alkyl, $C_6$ to $C_{12}$ aryl, branched or unbranched $C_1$ to $C_{12}$ alkoxy, $C_6$ to $C_{12}$ aryloxy, or halogen; $R_3$ is selected from hydrogen, or halogen; $R_4$ to $R_8$ are independently selected from hydrogen, branched or unbranched $C_1$ to $C_{12}$ alkyl, or halogen, and any of $R_4$ to $R_8$ can be taken together to form a saturated or unsaturated carbocyclic ring; and X is a halogen selected from chlorine, fluorine, or iodine.

2. The metathesis polymerizable composition of claim 1 wherein $R_2$ of said cocatalyst is selected from branched or unbranched $C_1$ to $C_{12}$ alkyl, $C_6$ to $C_{12}$ aryl, or halogen.

3. The metathesis polymerizable composition of claim 2 wherein $R_2$ and $R_3$ of said cocatalyst are halogen, $R_4$ to $R_8$ of said cocatalyst are branched or unbranched $C_1$ to $C_{12}$ alkyl, and X of said cocatalyst is chlorine.

4. The metathesis polymerizable composition of claim 3 wherein $R_6$ of said cocatalyst is hydrogen.

5. The metathesis polymerizable composition of claim 1 wherein said metathesis catalyst is selected from the group consisting of the halides, oxyhalides, oxides, and organoammonium salts of tungsten, molybdenum, and tantalum; sodium molybdate and ammonium hexamolybdate; and mixtures thereof.

6. The metathesis polymerizable composition of claim 5 wherein said metathesis catalyst is selected from the group consisting of tridodecyl ammonium molybdate, tridodecyl ammonium-tungstate, methyltricapryl ammonium molybdate, methyltricapryl ammonium tungstate, tri(tridecyl) ammonium molybdate, tri(tridecyl)ammonium tungstate, trioctyl ammonium molybdate, trioctyl ammonium tungstate and mixtures thereof.

7. A process for making a ring-opened polymer by polymerizing the composition of claims 1, 2, 3, 4, 5, or 6.

8. The process of claim 7 wherein the polymerization reaction is conducted in solution.

9. The process of claim 7 wherein the polymerization is conducted in an in-mold bulk process.

10. A cocatalyst composition for a metathesis catalyst system comprising a norbornene functional monomer and a halogenated aluminum compound selected from compounds of the formula:

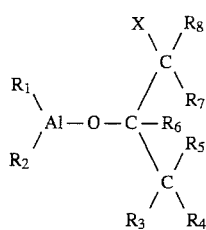

wherein $R_1$ is selected from branched or unbranched $C_1$ to $C_{12}$ alkyl, or $C_6$ to $C_{12}$ aryl; $R_2$ is selected from branched or unbranched $C_1$ to $C_{12}$ alkyl, $C_6$ to $C_{12}$ aryl, branched or unbranched $C_1$ to $C_{12}$ alkoxy, $C_6$ to $C_{12}$ aryloxy, or halogen; $R_3$ is selected from hydrogen, or halogen; $R_4$ to $R_8$ are independently selected from hydrogen, branched or unbranched $C_1$ to $C_{12}$ alkyl, or halogen, and any of $R_4$ to $R_8$ can be taken together to form a saturated or unsaturated carbocyclic ring; and X is a halogen selected from chlorine, fluorine, or iodine.

11. The composition of claim 10 wherein $R_2$ is selected from branched or unbranched $C_1$ to $C_{12}$ alkyl, $C_6$ to $C_{12}$ aryl, or halogen.

12. The composition of claim 11 wherein $R_2$ and $R_3$ are halogen, $R_4$ to $R_8$ are branched or unbranched $C_1$ to $C_{12}$ alkyl and X is chlorine.

13. The composition of claim 10 wherein $R_6$ is hydrogen.

14. The composition of claim 10, 11, 12, or 13 wherein said norbornene functional monomer is selected from the group consisting of dicyclopentadiene, tricyclopentadiene, and mixtures thereof.

15. A cocatalyst for a metathesis catalyst system comprising a halogenated aluminum compound selected from compounds of the formula:

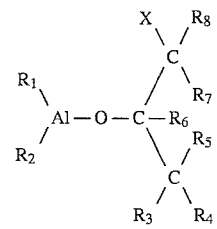

wherein $R_1$ is selected from branched or unbranched $C_1$ to $C_{12}$ alkyl, or $C_6$ to $C_{12}$ aryl; $R_2$ and $R_3$ are halogen; $R_4$ to $R_8$ are independently selected from hydrogen and branched or unbranched $C_1$ to $C_{12}$ alkyl, and any of $R_4$ to $R_8$ can be taken together to form a saturated or unsaturated carbocyclic ring; and X is a halogen selected from chlorine or iodine.

16. The cocatalyst of claim 15 wherein $R_6$ is hydrogen.

* * * * *